(12) United States Patent
 Gordon

(10) Patent No.: US 10,118,528 B2
(45) Date of Patent: Nov. 6, 2018

(54) MATERIAL DISPERSAL BLADE FOR A BOTTOM DUMP TRAILER

(71) Applicant: Glenn L. Gordon, Walcott, ND (US)

(72) Inventor: Glenn L. Gordon, Walcott, ND (US)

( * ) Notice: Subject to any disclaimer, the term of this patent is extended or adjusted under 35 U.S.C. 154(b) by 0 days.

(21) Appl. No.: 15/370,331

(22) Filed: Dec. 6, 2016

(65) Prior Publication Data
US 2017/0159248 A1 Jun. 8, 2017

Related U.S. Application Data

(60) Provisional application No. 62/264,247, filed on Dec. 7, 2015.

(51) Int. Cl.
*E01C 19/15* (2006.01)
*B60P 1/56* (2006.01)

(52) U.S. Cl.
CPC ............... *B60P 1/56* (2013.01); *E01C 19/15* (2013.01)

(58) Field of Classification Search
CPC .................................. E01C 19/15; B60P 1/56
See application file for complete search history.

(56) References Cited

U.S. PATENT DOCUMENTS

| | | | | |
|---|---|---|---|---|
| 3,198,579 A | * | 8/1965 | Adams | B60G 5/04 188/2 R |
| 4,188,152 A | * | 2/1980 | Kitt | E01C 19/15 172/452 |
| 4,871,025 A | * | 10/1989 | Mayfield | E02F 3/7663 172/4.5 |
| 5,158,394 A | * | 10/1992 | Bresnahan | E01C 19/15 404/108 |
| 6,164,866 A | * | 12/2000 | Wulff | B60P 1/56 404/104 |
| 6,386,792 B1 | * | 5/2002 | Stevenson | A01B 37/00 172/833 |
| 2006/0002762 A1 | * | 1/2006 | Crampton | E01C 19/15 404/110 |
| 2012/0282026 A1 | * | 11/2012 | Atherton | E01C 19/15 404/82 |
| 2015/0336496 A1 | * | 11/2015 | Smith | B60P 1/56 298/29 |
| 2017/0159247 A1 | | 6/2017 | Hudson et al. | |

* cited by examiner

*Primary Examiner* — Abigail A Risic
(74) *Attorney, Agent, or Firm* — Hamre, Schumann, Mueller & Larson, P.C.

(57) ABSTRACT

A bottom dump trailer that includes a spreading device mounted on the bottom dump trailer to spread material that is dumped by the bottom dump trailer. The spreading device spreads the material shortly after being dumped, eliminating the need for a separate machine to follow the bottom dump trailer to spread the material.

15 Claims, 7 Drawing Sheets

MATERIAL DISPERSAL BLADE FOR A BOTTOM DUMP TRAILER

FIELD

This disclosure relates to bottom dump trailers. More specifically, this disclosure relates to the spreading of material discharged from a bottom dump trailer (also known as a belly dump trailer) using a spreading device that is attached to the bottom dump trailer.

BACKGROUND

A bottom dump trailer is generally used to transport material from one location to another. The bottom dump trailer includes a frame having wheels and a material hopper mounted to the frame that is configured to hold material. A controllable gate mechanism is provided that controls the flow of material out of the material hopper assembly. Once material is dumped, a separate machine such as a road grader, a dozer or the like follows the bottom dump trailer and spreads the material.

SUMMARY

A bottom dump trailer is disclosed that includes a spreading device mounted on the bottom dump trailer to spread material that is dumped by the bottom dump trailer. The spreading device spreads the material shortly after being dumped, eliminating the need for a separate machine to follow the bottom dump trailer to spread the material.

The spreading device can be mounted at any location on the bottom dump trailer to achieve spreading of the material once the material is dumped. The spreading device is mounted downstream of or behind a hopper assembly of the bottom dump trailer. In one embodiment, the spreading device is mounted downstream of or behind the wheels of the bottom dump trailer.

In one embodiment, a bottom dump trailer includes a trailer frame, wheels mounted on the trailer frame that support the trailer frame for rolling movement along the ground, and a material hopper assembly mounted on the trailer frame that is configured to hold material to be dumped from the bottom dump trailer. The material hopper assembly includes a controllable gate mechanism adjacent to a base thereof that controls flow of material out of the base of the material hopper assembly, with the controllable gate mechanism including an open position that allows flow of material out of the material hopper assembly and a closed position that prevents flow of material out of the material hopper assembly. A leveling blade is mounted to the trailer frame to a rear of the controllable gate mechanism, with the leveling blade being movable relative to the trailer frame between a stored position and a deployed position. In addition, at least one actuator is connected to the trailer frame and connected to the leveling blade that actuates the leveling blade between the stored position and the deployed position.

In another embodiment, a material spreading device is provided that is attachable to a bottom dump trailer to spread material that is dumped from the bottom dump trailer. The material spreading device includes a leveling blade mounting frame that is configured to be removably attached to a trailer frame of the bottom dump trailer. A leveling blade is connected to the leveling blade mounting frame, with the leveling blade being moveable relative to the leveling blade mounting frame between a stored position and a deployed position. In addition, at least one actuator is connected to the leveling blade and connected to the leveling blade mounting frame that actuates the leveling blade between the stored position and the deployed position.

A method of spreading material that is dumped from a bottom dump trailer includes dumping material from the material hopper of the bottom dump trailer, and utilizing a leveling blade that is mounted to the bottom dump trailer to spread the material that is dumped from the material hopper.

DRAWINGS

Both described and other features, aspects, and advantages of the bottom dump trailer spreading device and methods of spreading material from a bottom dump trailer will be better understood with reference to the following drawings.

DETAILED DESCRIPTION

Figure 1:
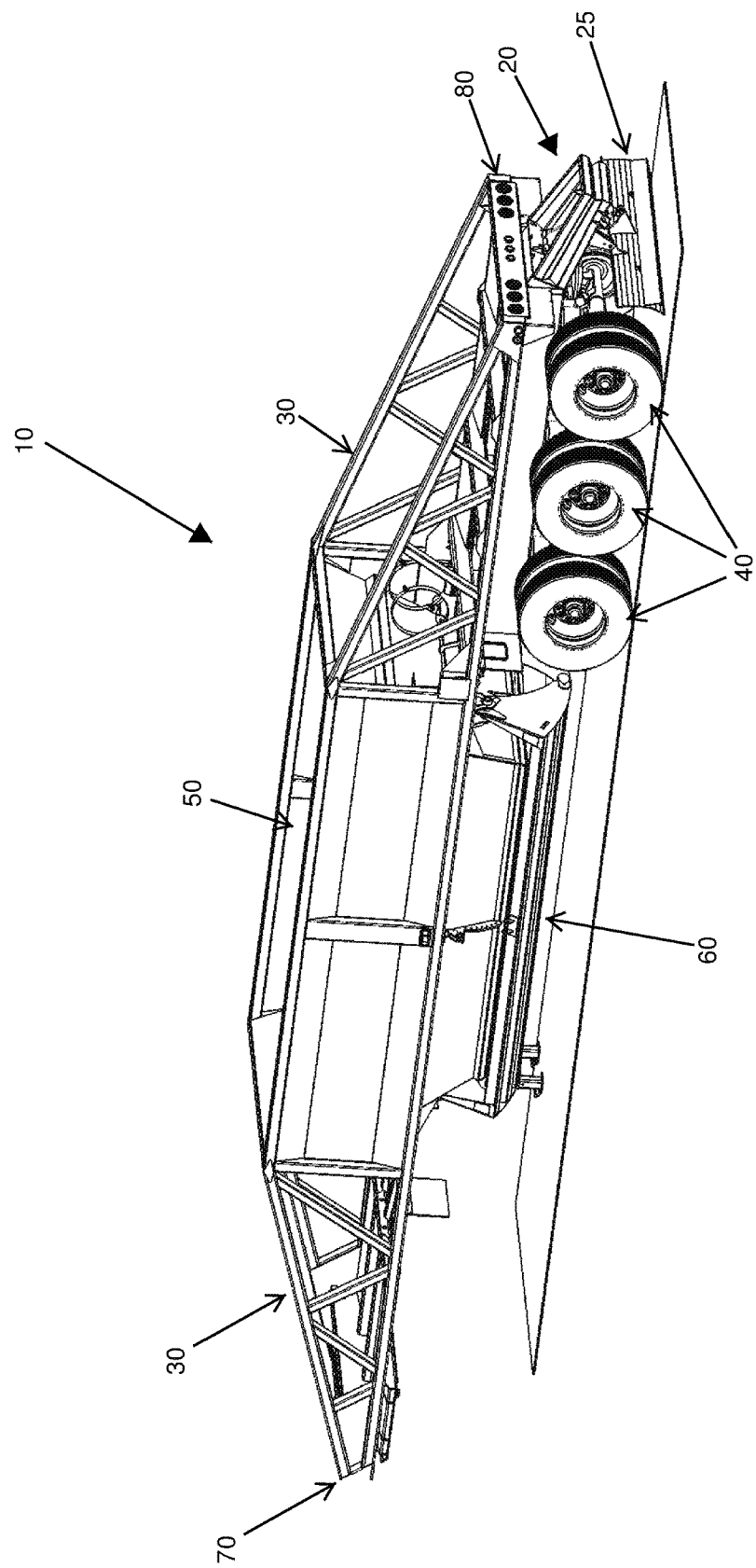
FIG. 1 is a perspective view of a bottom dump trailer described herein with the leveling blade in the deployed position.

A bottom dump trailer, which may also be referred to as belly dump trailer or semi-bottom dump, is a type of trailer that is employed for transporting material from one area to another. A bottom dump trailer is generally a trailer that is towed by a semi-truck and can be used to transport materials including, but not limited to, dirt, gravel, asphalt, or other aggregate materials. Commonly, construction companies and municipalities use bottom dump trailers to transport material to constructions sites and/or to apply material to roadways. An advantage of bottom dump trailers is that they can carry large loads, discharge material quickly, and discharge material in a windrow (i.e. in a straight line that follows the trailer).

Commonly, a bottom dump trailer will include a material hopper for holding the material that is being transported. A material hopper is designed to have an opening near its bottom through which the material is discharged when being dumped. The material hopper includes a gate mechanism that controllably blocks off the opening to control the discharge of the material through the opening. The gate mechanism is normally located near the bottom of the material hopper. This gate mechanism can partially close or fully close the opening in the material hopper, allowing the gate mechanism to control the flow of material out of the material hopper.

The material discharged from bottom dump trailer will generally form windrows due in part to the shape of the material hopper opening and the gate mechanism, as well as the direction of travel of the trailer during dumping. One reason a bottom dump trailer creates a windrow is because movement of the trailer while it is discharging is typically required. Generally, if a bottom dump trailer is not moving and the gate mechanism is open, the material will only keep flowing out of the material hopper until the material piles up to the gate mechanism. To keep the material flowing out of the hopper, a bottom dump trailer operator will typically keep the trailer continuously moving while it discharges material. In this instance, when material is flowing and the trailer is kept moving, a row of the material (i.e. a windrow) will be formed that trails behind the trailer.

In many situations, the windrows created by the bottom dump trailer must be spread out on the road, field or other area that the material is dumped on. Previously, other construction equipment or motorized machinery (e.g., a road grater or dozer) had to be used to spread these windrows. In many cases such equipment is only brought to a location for spreading these windrows. This separate equipment costs additional time and money for the person or party completing the work. In some cases the other equipment must wait while the bottom dump trailer transports and delivers the material to the required location.

Embodiments described in this specification may include a bottom dump trailer with a material spreading device mounted thereon. The bottom dump trailer with the material spreading device can be utilized to both transport and spread the material at a location, eliminating the need for other equipment to follow the bottom dump trailer to spread the material. In an embodiment, the material spreading device may include a leveling blade. The leveling blade may be positioned on the bottom dump trailer so that it spreads the windrows of material. In some embodiments the leveling blade may have multiple positions that allow for an adjustment of the distance between the ground and the leveling blade. In such embodiments, the leveling blade may be moved into a stored position farther away from the ground when the bottom dump trailer is traveling between locations or does not need to spread material.

Figure 2:
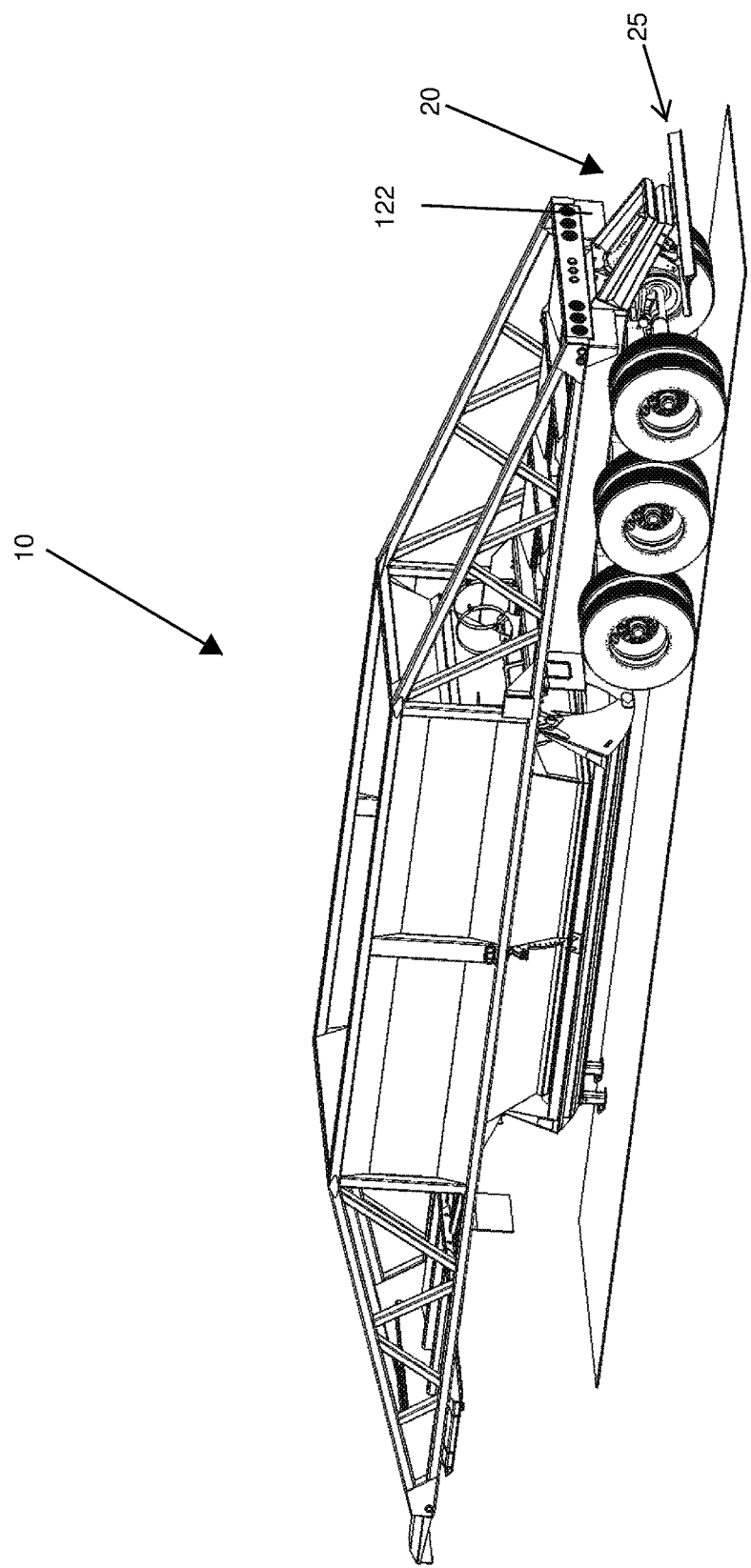
FIG. 2 is another perspective view of the bottom dump trailer with the leveling blade in the stored position.
Figure 3:
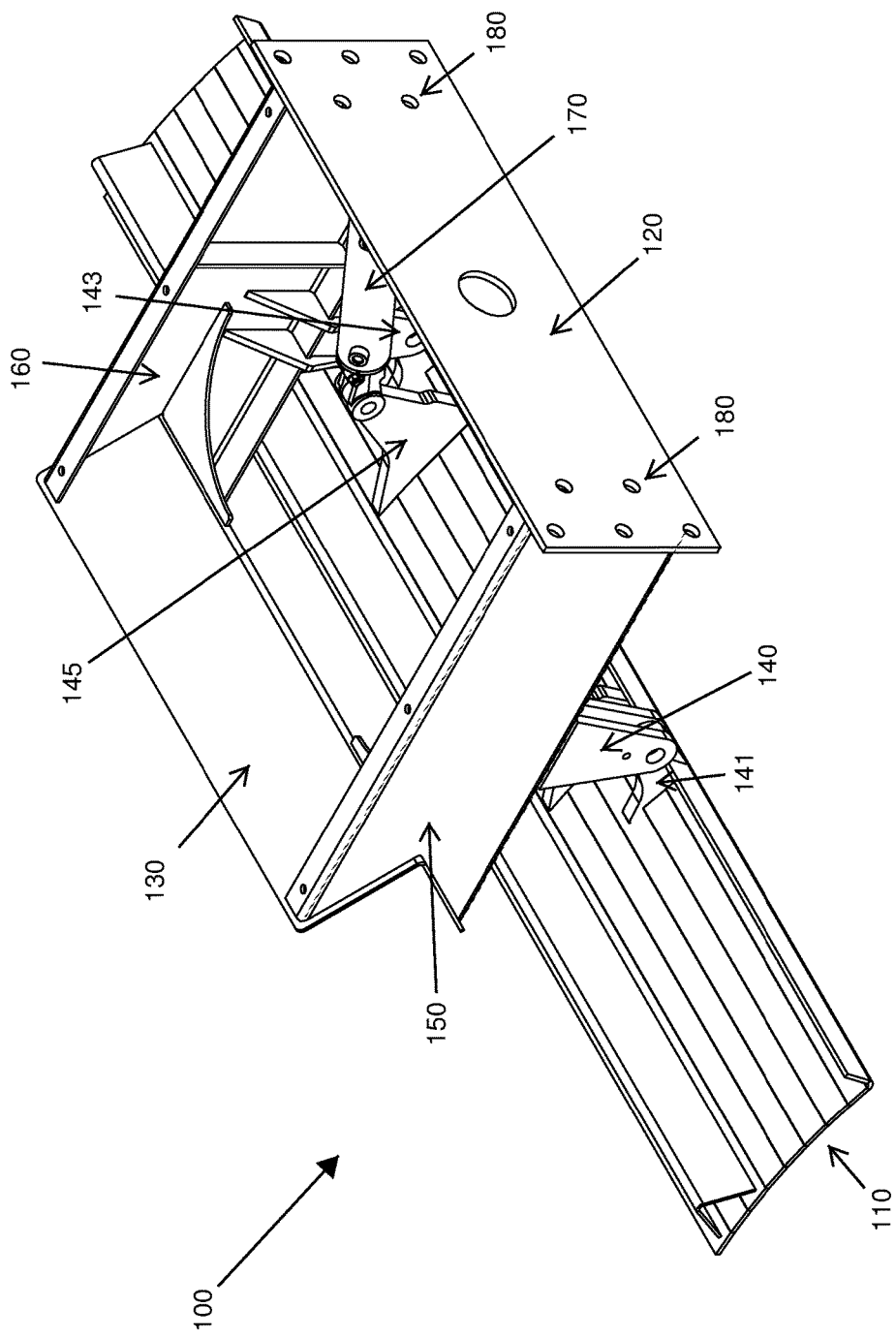
FIG. 3 is an upper perspective view of a material spreading device described herein that is attachable to the bottom dump trailer.

Referring initially to FIGS. 1 and 2, a bottom dump trailer 10 is illustrated that includes an embodiment of a spreading device 20. The bottom dump trailer 10 can include, among other features, a trailer frame 30, wheels 40 that support the trailer frame 30 on the ground and allow the trailer frame 30 to roll along the ground, a material hopper 50, a hopper gate mechanism 60, and the spreading device 20.

The bottom dump trailer 10 is illustrated as including three sets of the wheels 40, but other embodiments may include more or less sets of wheels 40 including one or more sets of wheels. In the illustrated embodiment, the bottom dump trailer 10 is configured to be connected to a tractor vehicle (not shown) at a front end 70 of the trailer frame 30 which pulls the bottom dump trailer 10 during use. However, in other embodiments, the bottom dump trailer 10 may be configured as a fully self-supported trailer that includes an integrated drive/engine assembly that provides locomotion for the bottom dump trailer 10 without requiring the bottom dump trailer to be attached to a tractor vehicle. Accordingly, the term "trailer" is intended to encompass structures that are pulled by a separate tractor vehicle the trailer is attached to as well as encompass structures that are provided with their own, integrated drive/engine assembly.

The material hopper 50 is supported by the trailer frame 30 and is configured to hold material during transport between locations. Generally, an opening is configured in the bottom of the material hopper 50 through which material can be discharged. A controllable gate mechanism 60 is associated with the opening to control the flow of material out of the material hopper 50. The gate mechanism 60 has a closed position that blocks the flow of material out of the material hopper 50 and an open position that permits the flow of material out of the material hopper 50. Operation of the gate mechanism 60 between the closed and open positions is controlled by a suitable actuator that can be automatically controlled or manually actuated. Many different types of gate mechanisms on material hoppers are known in the art and any type of gate mechanism can be used.

The trailer frame 30 includes the front end 70 and a back end 80. As described above, the front end 70 may be configured for attachment to a tractor vehicle (for example, a semi-truck) such that that bottom dump trailer 10 is secured to the tractor vehicle and the tractor vehicle may tow the bottom dump trailer 10 along the ground. In other embodiments, as described above, the front end 70 may include its own, integrated drive/engine assembly.

The spreading device 20 is attached to any location of the trailer frame 30 that permits the spreading device 20 to perform its material spreading functions. In the illustrated embodiment, the spreading device 20 is non-destructively removably attached to the back end 80 of the trailer frame 30.

The spreading device 20 may include a leveling blade 25. FIG. 1 shows the leveling blade 25 in a deployed position. When in a deployed position, the bottom edge of the leveling blade 25 is positioned near the ground to spread the windrow of material dumped from the material hopper 50 into a larger path as the bottom dump trailer 10 is pulled forward. FIG. 2 shows the spreading device 25 in a stored position. In the stored position, the bottom edge of the leveling blade 25 is positioned further from the ground compared to the deployed position. The leveling blade 25 is actuated between the deployed and stored positions by one or more actuators or other mechanical means.

In one embodiment, the leveling blade 25 has a longitudinal length or width $W_b$ (see FIG. 4) that is approximately the same as the width $W_t$ of the trailer frame 30. In another embodiment, the leveling blade 25 has a width $W_b$ that is approximately equal to a width $W_g$ of the gate mechanism 60 or the width $W_o$ of the bottom opening of the material hopper 50. In one embodiment, the leveling blade 25 does not extend (or only minimally extends) beyond the sides of the trailer frame 30 to avoid creating a possible road hazard. In other embodiments, the leveling blade 25 could temporarily extend beyond the sides of the trailer frame 30 when spreading material, but one or more ends of the leveling blade 25 could be retracted so they no longer extend beyond the side of the trailer frame 30 during transport. In one embodiment, the maximum width of the blade during spreading is about 102 inches. In one embodiment, the minimum width of the blade during spreading is about 72 inches.

Other embodiments of the bottom dump trailer 10 may position the spreading device 25 in a position different than the one shown in FIGS. 1 and 2. For example, an embodiment of the bottom dump trailer 10 may include a push block assembly at the back end 80 of the trailer frame 30 and the spreading device 25 may be specifically configured to fit under or within the push block assembly. In other embodiments, the spreading device 25 may be attached underneath the trailer frame 30, for example between the gate mechanism 60 and the wheels 40.

Referring to FIGS. 3, 4, 5A and 5B, a specific embodiment of a spreading device 100 that can be mounted to the bottom dump trailer 10 is illustrated. The spreading device 100 includes a leveling blade 110 mounted to a leveling blade mounting frame having a mounting plate 120, a left support plate 150, a right support plate 160, an end support plate 130, a right actuator 170, and a left actuator 175. In this embodiment, the terms "right" and "left" are in reference to the elements when viewing the spreading device 100 vertically from above.

The mounting plate 120, the left support plate 150, the right support plate 160, and the end support plate 130 form a support structure or mounting frame to which the leveling blade 110 is mounted. The components 120, 130, 150, 160 may be initially separate from one another and then affixed to each other by any method, for example welding or bolting, that provides a strong and reliable joining of the components. In another embodiment, the components 120, 130, 150, 160 may be integrally formed with each other to form an integral, one-piece construction.

Figure 6:
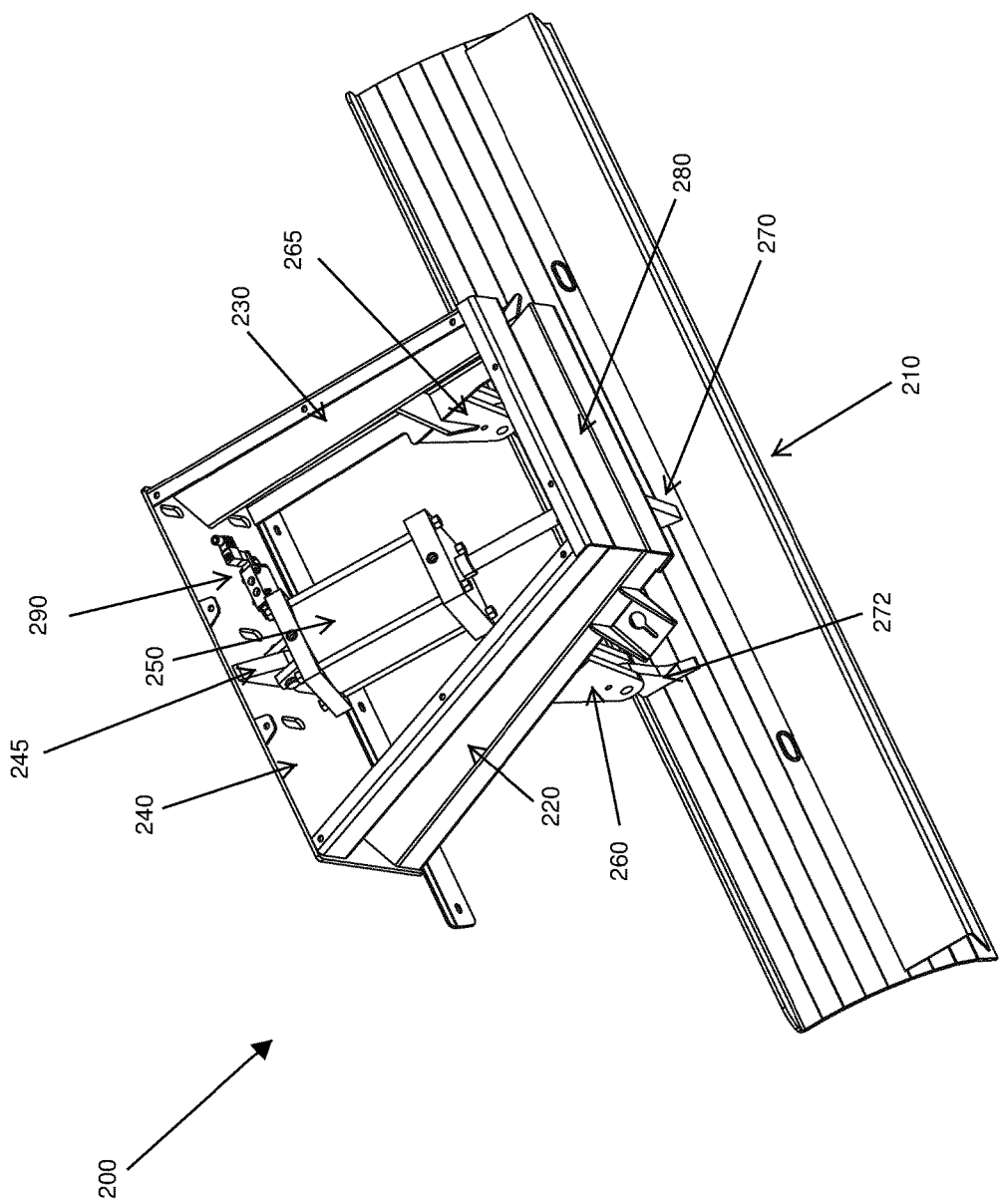
FIG. 6 is an upper perspective view of another embodiment of a material spreading device that is attachable to the bottom dump trailer.

The mounting plate 120 comprises a substantially flat plate that in use is fixedly mounted, for example by bolting, to a rear surface 122 of the trailer frame 30 (see FIG. 2). The left and right support plates 150, 160 are connected to and extend rearwardly from the mounting plate 120. In the illustrated example, longitudinal axes of the support plates 150, 160 are substantially perpendicular to the longitudinal axis of the mounting plate 120. However, in other embodiments, the longitudinal axes of the support plates can extend at angles to the longitudinal axis of the mounting plate 120, for example as shown in FIG. 6. The end support plate 130 is connected to the left and right support plates 150, 160 and has a longitudinal axis that is generally parallel to the longitudinal axis of the mounting plate 120. In this embodiment, the end support plate 130 has a longitudinal length that is substantially equal to the longitudinal length of the mounting plate 120, and the longitudinal lengths of the left and right support plates 150, 160 are substantially equal to one another, so that the leveling blade mounting frame forms a substantially rectangular structure.

The leveling blade 110 is mounted to the mounting frame so that the leveling blade 110 is disposed beneath the mounting plate 120, the left and right support plates 150, 160 and the end support plate 160. As is evident from FIGS. 3 and 4, the width $W_b$ of the leveling blade 110 is greater than a longitudinal width or length of the mounting plate 120 and is greater than a distance between the left and right support plates 150, 160.

Figure 4:
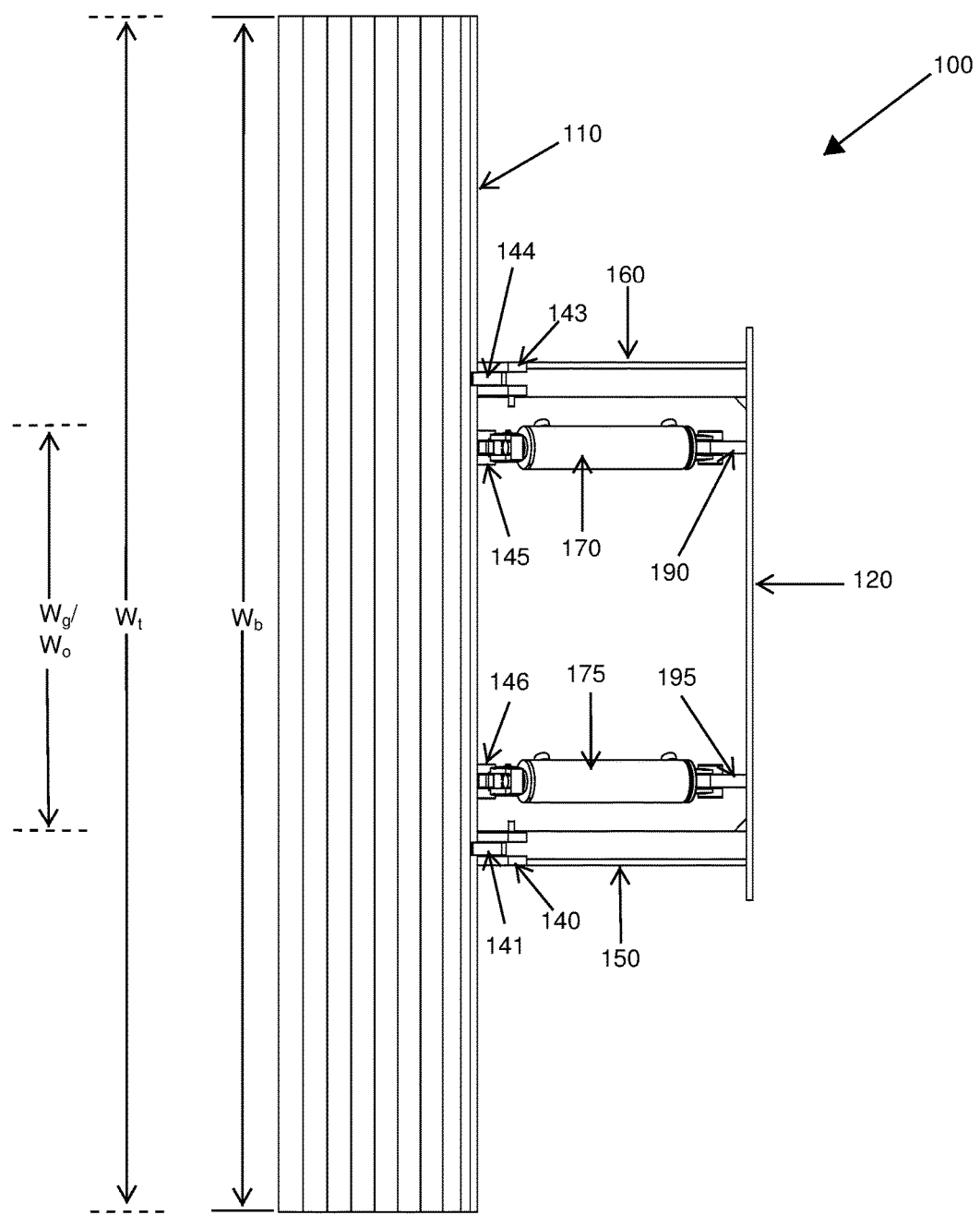
FIG. 4 is a bottom view of the material spreading device of FIG. 3.
Figure 5A:
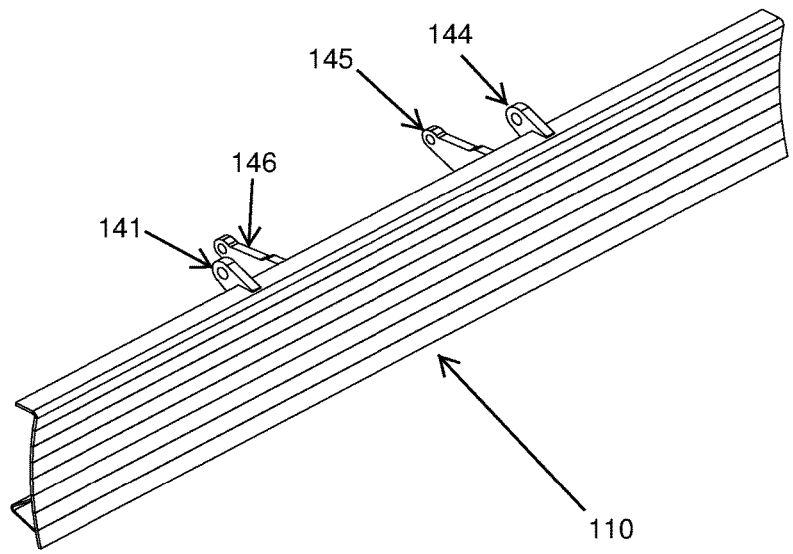
FIG. 5A is a perspective view of a front side of the leveling blade of the material spreading device.
Figure 5B:
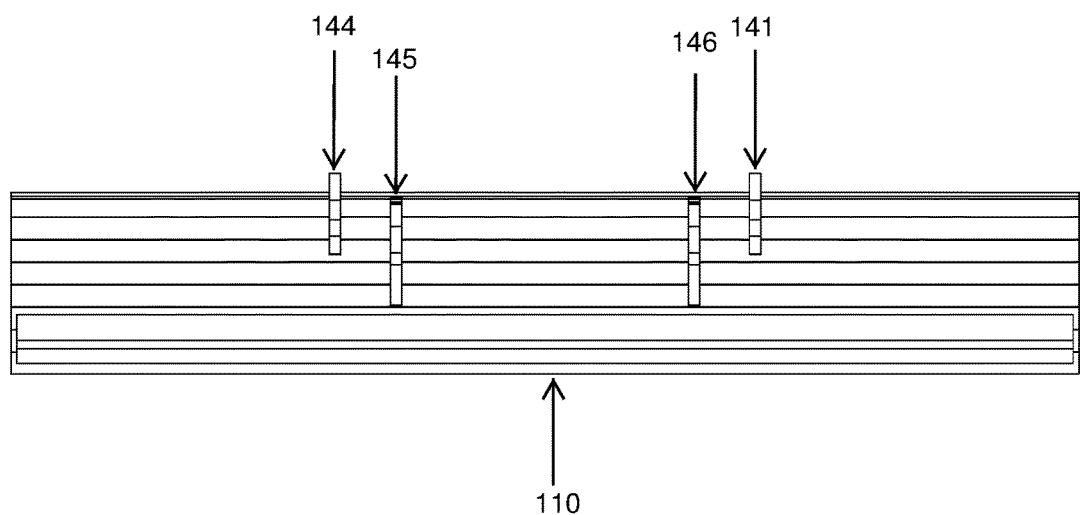
FIG. 5B is a view of the back side of the leveling blade of the material spreading device.

Referring to FIGS. 3, 4, 5A and 5B, the left support plate 150 is provided with a left blade support 140 and the right support plate 160 is provided with a right blade support 143. The leveling blade 110 includes left and right connecting tabs 141, 144 that are designed and positioned to be joined to the blade supports 140, 143. As best shown by FIG. 4, the left blade connecting tab 141 slides into a clevis space in the left blade support 140 and the right blade connecting tab 144 slides into a clevis space in the right blade support 143. Pins or bolts are then provided through corresponding holes in the connecting tabs 141, 144 and the blade supports 140, 143 to join the leveling blade 110 to the mounting frame. The pins or bolts allow the connecting tabs 141, 144 on the leveling blade 110 to pivot relative to the blade supports 140, 143 to allow the leveling blade 110 to rotate between a stored position and a deployed position.

The actuators 170, 175 are connected between the mounting frame and the leveling blade 110 to actuate the leveling blade 110 between the stored position and the deployed position. In the illustrated embodiment, the actuators 170, 175 are attached between the leveling blade 110 and the mounting plate 120. For example, the mounting plate 120 is provided with a first actuator support 195 for the actuator 175 and a second actuator support 190 for the actuator 170. The ends of the actuators 170, 175 are fixed to the actuator supports 190, 195 to secure the ends of the actuators to the support frame. In addition, the leveling blade 110 includes a first actuator blade support 146 connected to the opposite end of the actuator 175 and a second actuator blade support 145 connected to the opposite end of the actuator 170. The actuators 170, 175 may be attached to the supports 145, 146, 190, 195 using any suitable connection means such as pins or bolts.

Although the embodiment illustrated in FIGS. 3, 4, 5A, and 5B is illustrated as using two actuators, a single actuator or more than two actuators could be used. In addition, although the leveling blade 110 is described as pivoting when moving between the stored and deployed positions, it is possible that the leveling blade 110 can have other movements, such as linear movements, when moving between the stored and deployed positions.

Figure 7:
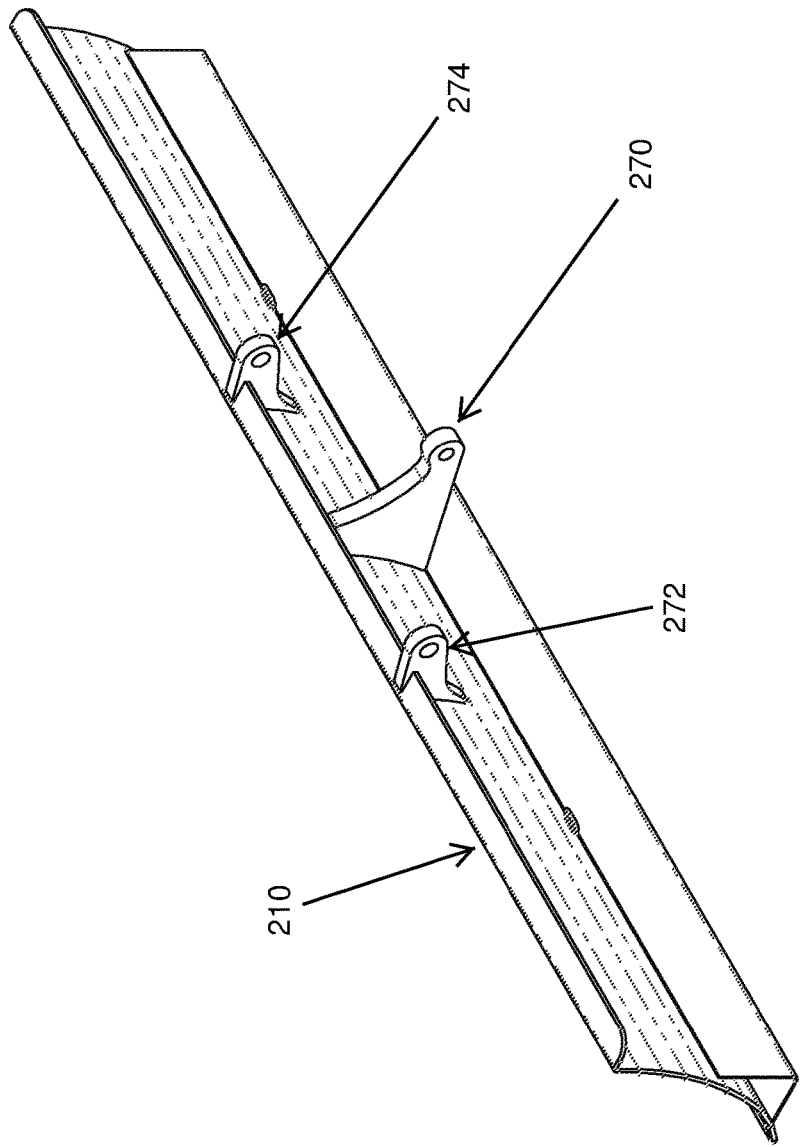
FIG. 7 is a perspective view of a back side of the leveling blade used with the material spreading device of FIG. 6.

FIGS. 6 and 7 illustrate an alternative embodiment of a spreading device 200 that can be removably mounted onto the bottom dump trailer 10. In this embodiment, the spreading device 200 includes a leveling blade mounting frame to which is mounted a leveling blade 210. The mounting frame includes a mounting plate 240, a left support plate 230, a right support plate 220, and an end support plate 280. The mounting plate 240, the left support plate 230, the right support plate 220, and the end support plate 280 form a support structure or mounting frame to which the leveling blade 210 is mounted. The components 220, 230, 240, 280 may be initially separate from one another and then affixed to each other by any method, for example welding or bolting, that provides a strong and reliable joining of the components. In another embodiment, the components 220, 230, 240, 280 may be integrally formed with each other to form an integral, one-piece construction.

The mounting plate 240 comprises a substantially flat plate that in use is fixedly mounted, for example by bolting, to a rear surface 122 of the trailer frame 30 (see FIG. 1). The left and right support plates 220, 230 are connected to and extend rearwardly from the mounting plate 240. In the illustrated example, longitudinal axes of the support plates 220, 230 angled relative to the longitudinal axis of the mounting plate 240. However, in other embodiments, the longitudinal axes of the support plates can extend perpendicular to the longitudinal axis of the mounting plate 240. The end support plate 280 is connected to the left and right support plates 220, 230 and has a longitudinal axis that is generally parallel to the longitudinal axis of the mounting plate 240. In this embodiment, the end support plate 280 has a longitudinal length that is less than the longitudinal length of the mounting plate 240, and the longitudinal lengths of the left and right support plates 220, 230 are substantially equal to one another. Therefore, the leveling blade mounting frame in this embodiment forms a tapered support structure.

As illustrated in FIG. 6, the left support plate 230 is provided with a left blade support 265 and the right support plate 220 is provided with a right blade support 260. In addition, the leveling blade 210 include a left blade connector 274 and right blade connector 272 that are secured to the blade supports 265, 260, respectively in a similar manner as described above for the leveling blade 110. Therefore, the leveling blade 210 is supported to the mounting frame while allowing the leveling blade 210 to rotate relative to the mounting frame.

The spreading device 200 illustrated in FIG. 6 uses a single actuator 250. The actuator 250 may be attached between the mounting plate 240 and the leveling blade 210.

For example, the mounting plate 240 can include an actuator support 245 and the leveling blade 210 can include an actuator blade support 270 to which the ends of the actuator 250 are attached, for example using pins or bolts.

The spreading device 200 operates in a manner similar to spreading device 100. For example, the leveling blade 210 can be moved between a stored position and a deployed position, for example by pivoting relative to the mounting frame.

In the spreading devices 100, 200 described herein, the actuators 170, 175, 250 can be fluid actuated (for example hydraulic or pneumatic cylinders) or electrically actuated (for example, mechanical screwjacks). In the case of fluid actuated actuators, suitable valving 290 (see FIG. 6) can be provided on the mounting frame that provides a fluid connection between the actuator(s) and a fluid system on the bottom dump trailer 10. The type of actuator employed may be dependent upon the specific circumstances and design considerations. For example, the type of actuator used may be dependent upon a fluid system employed by the bottom dump trailer 10 or a vehicle hauling the trailer (e.g. semi-truck). For example, if the bottom dump trailer employs a hydraulic system, the actuators used may be hydraulic actuators. Other embodiments may employ pneumatic, electrical, or mechanical actuators.

In the spreading devices 25, 100, 200, a top cover plate that covers some or all of the top of the mounting frame and/or a bottom cover plate that covers some or all of the bottom of the mounting frame can be used. In addition, instead of mounting the spreading device 100, 200 to the rear surface 120 of the trailer frame 30, the spreading device 100, 200 can be mounted at a location under the trailer frame 30, or under, on or within a push block assembly sometimes found at the rear end of some bottom dump trailers.

Operation of the spreading devices 20, 110, 200 described should be readily apparent from the above description and the accompanying drawings. However, a brief description will be provided. The spreading device is first mounted to the bottom dump trailer which can occur before or after the material hopper of the trailer is filled with material to be dumped. During general transport of the bottom dump trailer, the leveling blade is preferably actuated to the stored position so that the leveling blade is out of the way and does not interfere with travel of the bottom dump trailer. When dumping and spreading of material is desired, for example on a surface of a road, the leveling blade is actuated to the deployed position, readying the leveling blade to spread material that is dumped from the material hopper. As the bottom dump trailer moves forward along the road, the gate mechanism is controlled to dump material from the material hopper. As the bottom dump trailer continues to move forwardly, the leveling blade mounted to the bottom dump trailer spreads the dumped material along the road.

Depending upon the amount of material within the material hopper and the rate at which the material is discharged from the hopper, the leveling blade will spread the dumped material as additional material is being dumped from the material hopper. Once all material has been dumped from the material hopper, the leveling blade will continue to spread the remaining dumped material until the leveling blade reaches the end of the windrow. The leveling blade can then be actuated to the stored position.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A bottom dump trailer comprising:
a trailer frame;
wheels mounted on the trailer frame that support the trailer frame for rolling movement along the ground;
a material hopper assembly mounted on the trailer frame that is configured to hold material to be dumped from the bottom dump trailer, the material hopper assembly includes a controllable gate mechanism adjacent a base thereof that controls flow of material out of the base of the material hopper assembly, the controllable gate mechanism includes an open position that allows flow of material out of the material hopper assembly onto the ground under the trailer frame and a closed position that prevents flow of material out of the material hopper assembly;
a leveling blade mounted to the trailer frame to a rear of the controllable gate mechanism, the leveling blade is movable relative to the trailer frame between a stored position and a deployed position, the leveling blade being configured to spread the material dumped onto the ground under the trailer frame when in the deployed position; and
at least one actuator connected to the trailer frame and connected to the leveling blade and that moves the leveling blade between the stored position and the deployed position.

2. The bottom dump trailer of claim 1, wherein
the wheels are rear wheels of the trailer frame, and
the leveling blade is mounted on the trailer frame to the rear of the rear wheels.

3. The bottom dump trailer of claim 1, wherein the leveling blade is mounted to a bottom side of a mounting frame that is removably mounted on the trailer frame.

4. The bottom dump trailer of claim 2, wherein the leveling blade is mounted to a back end of the trailer frame.

5. The bottom dump trailer of claim 1, wherein the leveling blade has a height and a width, and the width of the leveling blade is equal to or less than a width of the trailer frame.

6. The bottom dump trailer of claim 1, wherein the leveling blade has a width that is equal to or greater than a width of the controllable gate mechanism.

7. The bottom dump trailer of claim 1, wherein the leveling blade is rotatable relative to the trailer frame when moving between the stored position and the deployed position.

8. The bottom dump trailer of claim 1, wherein the leveling blade is mounted on the trailer frame such that the wheels are located between the controllable gate mechanism and the leveling blade.

9. The bottom dump trailer of claim 1, wherein the gate mechanism is located under the trailer frame.

10. The bottom dump trailer of claim 1, wherein the leveling blade is movable relative to both the trailer frame and the material hopper.

11. A material spreading device that is attachable to a bottom dump trailer to spread material that is dumped from the bottom dump trailer, the material spreading device comprising:
a leveling blade mounting frame that is configured to be removably attached to a trailer frame of the bottom dump trailer, the leveling blade mounting frame including two blade supports and at least one actuator support;

a leveling blade connected to the leveling blade mounting frame and including at least one actuator blade support and two connecting tabs that extend from a rear surface of the leveling blade, the leveling blade being moveable relative to the leveling blade mounting frame between a stored position and a deployed position, each of the two connecting tabs of the leveling blade being attached to a respective one of the two blade supports of the leveling blade mounting frame; and at least one actuator having a first end attached to the at least one actuator blade support of the leveling blade and a second end attached to the at least one actuator support of the leveling blade mounting frame, the at least one actuator moves the leveling blade between the stored position and the deployed position, an edge of the leveling blade being moved closer to the ground when the leveling blade is moved from the stored position to the deployed position.

12. The material spreading device of claim 11, wherein the leveling blade is rotatable relative to the leveling blade mounting frame when moving between the stored position and the deployed position.

13. The material spreading device of claim 11, wherein
the leveling blade mounting frame includes a mounting plate that is configured for attachment to the trailer frame, left and right support plates connected to and extending rearwardly from the mounting plate, and an end support plate connected to the left and right support plates,
the leveling blade is disposed beneath the mounting plate, the left and right support plates, and the end support plate, and
the leveling blade has a width that is greater than a width of the mounting plate and greater than a distance between the left and right support plates.

14. The material spreading device of claim 11, wherein the leveling blade is connected to the leveling blade mounting frame so as to be to the rear of rear wheels on the bottom dump trailer that support the bottom dump trailer for rolling movement along the ground, when the material spreading device is attached to the bottom dump trailer.

15. The material spreading device of claim 11, wherein the leveling blade is connected to the leveling blade mounting frame so that wheels on the bottom dump trailer that support the bottom dump trailer for rolling movement along the ground are between an opening of a material hopper of the bottom dump trailer through which the material is dumped and the leveling blade, when the material spreading device is attached to the bottom dump trailer.

* * * * *